United States Patent
Mii et al.

(10) Patent No.: US 8,204,970 B2
(45) Date of Patent: Jun. 19, 2012

(54) REMOTE UPDATE SYSTEM FOR ELEVATOR CONTROL PROGRAM

(75) Inventors: Satoshi Mii, Tokyo (JP); Ryozo Kiyohara, Tokyo (JP); Kunikazu Koura, Tokyo (JP); Hideki Shiozaki, Tokyo (JP); Morimasa Yokota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 944 days.

(21) Appl. No.: 12/223,710

(22) PCT Filed: Feb. 10, 2006

(86) PCT No.: PCT/JP2006/302361
§ 371 (c)(1),
(2), (4) Date: Sep. 18, 2008

(87) PCT Pub. No.: WO2007/091330
PCT Pub. Date: Aug. 16, 2007

(65) Prior Publication Data
US 2009/0049441 A1   Feb. 19, 2009

(51) Int. Cl.
*G06F 15/177* (2006.01)
*G06F 9/44* (2006.01)

(52) U.S. Cl. .................. 709/221; 717/172

(58) Field of Classification Search .......... 709/217–222, 709/224–226, 201–203, 208–211; 717/168–178; 187/247–249; 700/2–7, 9–27
See application file for complete search history.

(56) References Cited

U.S. PATENT DOCUMENTS

| | | | | |
|---|---|---|---|---|
| 6,708,801 B2 * | 3/2004 | Nakai | ................ | 187/382 |
| 7,124,143 B2 * | 10/2006 | Matsunami et al. | ................ | 1/1 |
| 7,216,343 B2 * | 5/2007 | Das et al. | ................ | 717/168 |
| 2004/0015942 A1 * | 1/2004 | Branson et al. | ................ | 717/168 |

FOREIGN PATENT DOCUMENTS

| | | |
|---|---|---|
| JP | 7-112878 A | 5/1995 |
| JP | 2000-67021 A | 3/2000 |
| JP | 2000-89941 A | 3/2000 |
| JP | 2002-20052 A | 1/2002 |
| JP | 2002-60154 A | 2/2002 |
| JP | 2002-132511 A | 5/2002 |
| JP | 2002-222068 A | 8/2002 |
| JP | 2003-81552 A | 3/2003 |
| JP | 2005-255275 A | 9/2005 |

* cited by examiner

*Primary Examiner* — Chirag R Patel
(74) *Attorney, Agent, or Firm* — Birch, Stewart, Kolasch & Birch, LLP.

(57) ABSTRACT

Obtained is a remote update system for an elevator control program, which is capable of sequentially realizing update of control programs of a plurality of elevators with reduced communication time and costs without stopping the plurality of elevators at the same time. A server 10 delivers to a representative elevator 30(1) update data including differential information between the control program of a version before update and the control program of the latest version to be updated to through a communication line 20, and the representative elevator 30(1) and other elevators 30(2) to 30(N) sequentially transfer the update data according to a predetermined transfer order, and update their own control programs based on the update data including the differential data.

12 Claims, 1 Drawing Sheet

REMOTE UPDATE SYSTEM FOR ELEVATOR CONTROL PROGRAM

TECHNICAL FIELD

The present invention relates to a remote update system for an elevator control program which implements a control program update of a plurality of elevators which are located within the same management group from a remote location.

BACKGROUND ART

As a system that updates the control program of elevators from the remote location, there is a system in which a management computer and the elevators are connected to each other through a modem and a public line, and the control program of new version is transmitted to the elevators from the management computer (for example, refer to Patent Document 1).

Also, as a system that updates the control program of a plurality of devices that are connected to each other from the remote location with a reduced communication charge, there is a system in which, using a program update system of a plurality of service devices arranged in a service base, one service device receives the update program from an update program distribution server on behalf of other service devices, and transfers the received update program to the other devices within the service base, to thereby reduce a communication time and the costs (for example, refer to Patent Document 2).

Patent Document 1: JP 2002-20052 A (page 1, FIG. 1)
Patent Document 2: JP 2002-132511 A (page 1, FIG. 1)

DISCLOSURE OF THE INVENTION

Problems to be Solved by the Invention

However, the related art suffers from the following problems. In the conventional system disclosed in Patent Document 1, when it is necessary to update the control program of the plurality of elevators, the control program of new version must be transmitted to all of the elevators to be managed. This causes such a problem that the communication time and the costs between the management computer and the elevators are increased.

Also, in the conventional system disclosed in Patent Document 2, whether or not the update program can be applied to all of the service devices is not considered. In particular, a case of updating the control program with differential information between the update program of new version and the update program of old version is not considered.

The present invention has been made to solve the above problems, and an object of the present invention is to provide a remote update system for an elevator control program which is capable of sequentially realizing the update of the control program of the plurality of elevators with reduced communication time and costs without stopping the plurality of elevators at the same time.

Means for Solving the Problems

A remote update system for an elevator control program according to the present invention includes: a plurality of elevators that are located within the same management group and connected to each other via a network, and provide services according to a control program held by each of the plurality of elevators; and a server that is connected to each of the plurality of elevators through a communication line, and delivers update data of the control program. The server delivers to one predetermined representative elevator among the plurality of elevators the update data including differential information between the control program of a version before update of the representative elevator and the control program of the latest version to be updated to through the communication line. The representative elevator updates its own control program based on the update data that is received from the server, and transmits the update data to an elevator to which the update data is to be subsequently transferred according to a predetermined transfer order through the network. Each of the plurality of elevators other than the representative elevator sequentially transmits and receives the update data through the network according to the predetermined transfer order, and updates its own control program based on the received update data.

Effects of the Invention

According to the present invention, there can be obtained a remote update system for an elevator control program in which one representative elevator receives the update data that is the differential information from the server through the communication line, elevators other than the representative elevator sequentially transmit and receive the update data through a network according to the predetermined transfer order, and each of the elevators sequentially updates the control program based on the differential information, thereby making it possible to sequentially realize the update of the control program of the plurality of elevators with reduced communication time and costs without stopping the plurality of elevators at the same time.

BEST MODE FOR CARRYING OUT THE INVENTION

Hereinafter, a description is given of a preferred embodiment of a remote update system for an elevator control program according to the present invention with reference to the drawings.

First Embodiment

Figure 1:
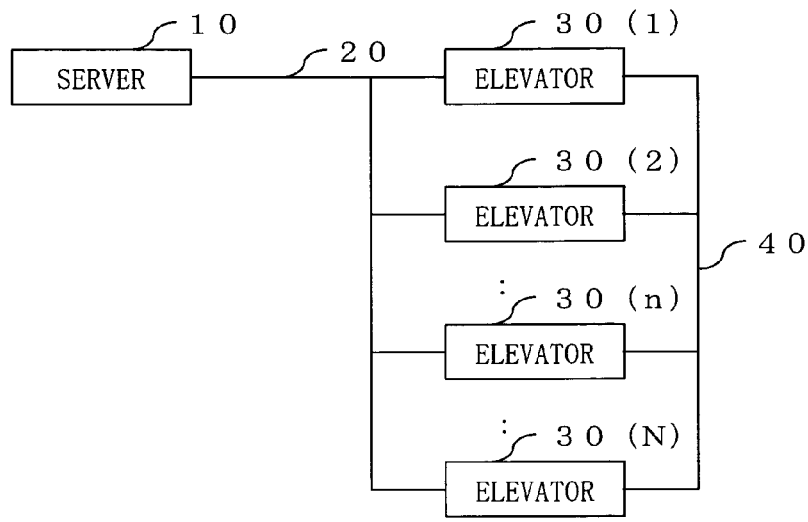
FIG. 1 A structural diagram showing a remote update system for an elevator control program according to a first embodiment of the present invention.

FIG. 1 is a structural diagram showing an entire remote update system for an elevator control program according to a first embodiment of the present invention. The remote update system includes a server 10, a communication line 20, a plurality of elevators 30(1) to 30(N) (N is a positive number equal to or more than 2), and a network 40 that connects the plurality of elevators 30(1) to 30(N) to each other. In this example, the plurality of elevators 30(1) to 30(N) are located within the same management group, and basically controlled by the control program of the same kind and the same version.

The server 10 stores the update data of the control program for the plurality of elevators 30(1) to 30(N) therein. In updating the data, update is instructed to any one of the plurality of elevators 30(1) to 30(N) from the server 10, to thereby transfer the update data through the communication line 20, or the server 10 transfers the update data through the communication line 20 according to a request from any one of the plurality of elevators 30(1) to 30(N).

The update data according to the first embodiment includes the differential information between the control program of a version before update and is retained by the elevators 30(1) to 30(N) and the control program of the latest version, and additional data (for example, version information on the control program of the latest version).

The communication line 20 is a line that connects the server 10 and the respective elevators 30(1) to 30(N) to enable a data communication, and a wire communication line such as a telephone line network or a radio communication line such as a PHS network are available. The communication line 20 is generally provided to conduct diverse reports to a monitor center (not shown) from the elevators 30(1) to 30(N), and can be so configured as to be also used for transferring update data.

In the present invention, a representative elevator which is predetermined as one of the plurality of elevators 30(1) to 30(N) receives the update data from the server 10. Also, the present invention is characterized in that the remaining elevators other than the representative elevator sequentially transmit and receive the update data in a predetermined order. Further, the present invention is characterized in that the differential information between the control program before update and the control program of the latest version is transmitted or received as the update data.

Figure 2:
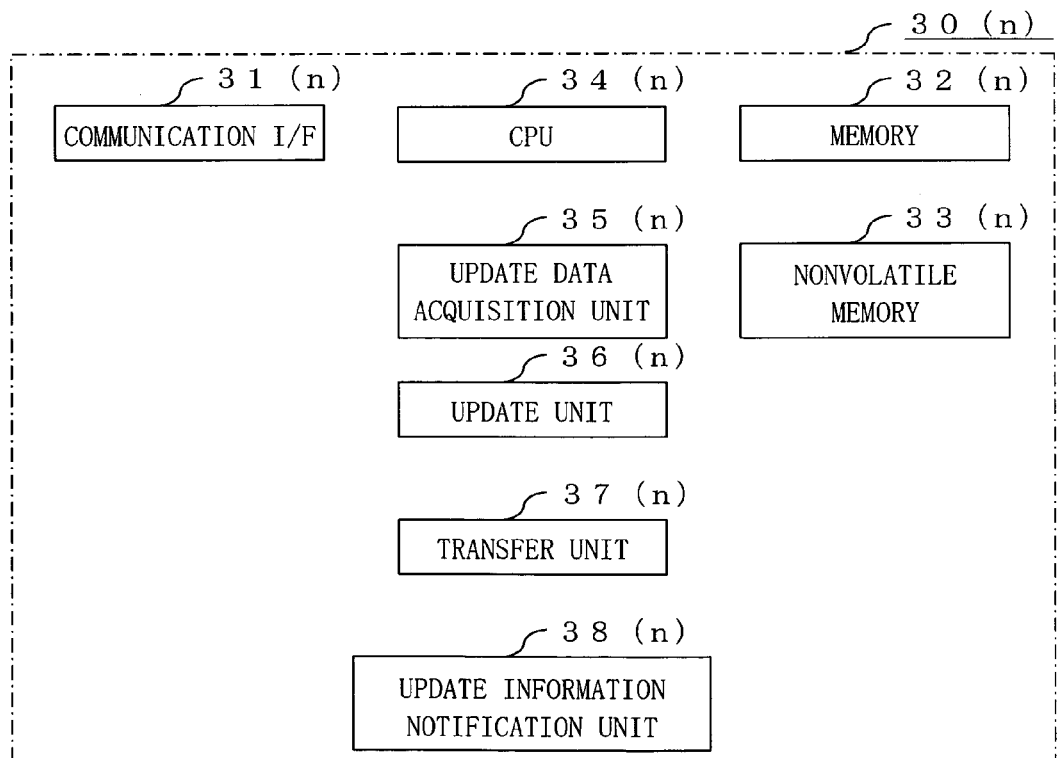
FIG. 2 A structural diagram showing an elevator according to the first embodiment of the present invention.

Subsequently, the internal structure of the respective elevators 30(n) (n is a positive number of 1≦n≦N) is described based on the above features. FIG. 2 is an internal structural diagram of the elevator 30(n) according to the first embodiment of the present invention. The elevator 30(n) includes a communication interface (communication I/F) 31(n) for communicating with an external, a memory 32(n) and a nonvolatile memory 33(n) which are storage units, a CPU 34(n) that controls the operation of the elevators, an update data acquisition unit 35(n) that is controlled by the CPU 34(n), an update unit 36(n), a transfer unit 37(n), and an update information notification unit 38(n).

The communication I/F 31(n) is an interface unit for connection with the communication line 20 or the network 40. Also, the memory 32(n) is a storage unit for temporarily storing the update data, and the nonvolatile memory 33(n) is a rewritable storage unit for storing the control program therein. Further, the CPU 34(n) executes the control program that is stored in the nonvolatile memory 33(n), and controls the respective executions of the update data acquisition unit 35(n), the update unit 36(n), the transfer unit 37(n), and the update information notification unit 38(n).

As shown in FIG. 1, the plurality of elevators 30(1) to 30(N) are connected to each other on the network 40. Information for identifying the respective elevators, such as ID numbers, is allocated to those elevators 30(1) to 30(N). Also, any one elevator of the plurality of elevators 30(1) to 30(N) is predetermined as a representative elevator.

In transferring data between the plurality of elevators 30(1) to 30(N), the order in which the data goes through all of the elevators from the representative elevator and returns to the representative elevator is uniquely predetermined. ID numbers, information on whether or not it is the representative elevator, and information on a subsequent elevator are stored in the memory 32(n) or the nonvolatile memory 33(n) as the elevator related information in advance.

The basic structure of the respective elevators is as shown in FIG. 2. The representative elevator and the other elevators are partially different in operation from each other. Under the circumstances, in the following description, it is assumed that there are three elevators. Also, it is assumed that a first elevator 30(1) is a representative elevator. Further, an example in which the update data is transferred in the order of the first representative elevator 30(1), a second elevator 30(2), and a third elevator 30(3) is described.

Accordingly, when suffixes attached to the respective symbols are (1), they mean the respective structural elements of the first representative elevator. Also, when suffixes attached to the respective symbols are (2), they mean the respective structural elements of the second elevator 30(2) that receives the update data from the representative elevator 30(1). Further, when suffixes attached to the respective symbols are (3), they mean the respective structural elements of the third elevator 30(3) that finally receives the update data.

First of all, the operation of the representative elevator 30(1) is described.

The update data acquisition unit 35(1) of the representative elevator acquires the update data from the server 10 through the communication I/F 31(1), and temporarily stores the update data in the memory 32(1). The update unit 36(1) updates the control program on the nonvolatile memory 33(1) using the differential information within the update data which has been stored in the memory 32(1).

The elevator 30(1) stops servicing during updating of the control program. Also, the update operation of the control program can include test operation after the nonvolatile memory 33(1) has been rewritten. On the other hand, the other elevators 30(2) and 30(3) continue the normal operation while the control program of the representative elevator 30(1) is being updated.

Upon completion of the update, the transfer unit 37(1) transfers the update data that has been stored in the memory 32(1) to the elevator 30(2) in a predetermined subsequent transfer order. The operation of the update information notification unit 38(1) is described later.

Subsequently, processing that is conducted in the elevator 30(2) which is situated at an intermediate position is described in detail.

The update data acquisition unit 35(2) within the elevator 30(2) acquires the update data from the representative elevator 30(1) that is a previous elevator through the network 40 and the communication I/F 31(2), and temporarily stores the update data in the memory 32(2). The update unit 36(2) updates the control program on the nonvolatile memory 33(2) using the differential information within the update data which has been stored in the memory 32(2).

The elevator 30(2) stops servicing during updating of the control program. Also, the update operation of the control program can include test operation after the nonvolatile memory 33(2) has been rewritten. On the other hand, the other elevators 30(1) and 30(3) continue the normal operation while the control program of the elevator 30(2) is being updated. Accordingly, the representative elevator 30(1) conducts the operation according to the control program that has been already updated.

Upon completion of the update, the transfer unit 37(2) determines whether or not the subsequent elevator 30(3) is the representative elevator, by acquiring the information that is stored in the transfer unit 37(2) or making inquiries to the subsequent elevator 30(3). Then, the transfer unit 37(2) transfers the update data that has been stored in the memory 32(2) to the subsequent elevator 30(3) because the subsequent elevator is the elevator 30(3) that is not the representative elevator.

Subsequently, processing that is conducted in the third elevator 30(3) which last receives the update data is described in detail.

The update data acquisition unit 35(3) within the elevator 30(3) acquires the update data from the previous elevator 30(2) through the network 40 and the communication I/F 31(3), and temporarily stores the update data in the memory 32(3). The update unit 36(3) updates the control program on the nonvolatile memory 33(3) using the differential information within the update data which has been stored in the memory 32(3).

The elevator 30(3) stops servicing during updating of the control program. Also, the update operation of the control program can include test operation after the nonvolatile memory 33(3) has been rewritten. On the other hand, the other elevators 30(1) and 30(2) continue the normal operation while the control program of the elevator 30(3) is being updated. Accordingly, the representative elevator 30(1) and the elevator 30(2) conduct the operation according to the control programs that have been already updated.

Upon completion of the update, the transfer unit 37(3) determines whether or not the subsequent elevator 30(1) is the representative elevator, by acquiring the information that is stored in the transfer unit 37(3) or making inquiries to the subsequent elevator 30(1). That is, the third elevator 30(3) that last receives the update data notifies the representative elevator 30(1) of the completion of update because there exists no elevator to which the update data should be transferred subsequently to the third elevator 30(3) and the representative elevator 30(1) is predetermined as an elevator to which the information should be subsequently transferred.

The transfer unit 37(3) does not transfer the update data that has been stored in the memory 32(3) because the subsequent elevator is the representative elevator 30(1), and transmits a sequential transfer completion notification indicating that the sequential transfer of the update data has been completed to the representative elevator 30(1).

On the other hand, the update information notification unit 38(1) within the representative elevator 30(1) which has received the sequential transfer completion notification transmits that a process of updating the control program for all of the elevators has been completed to the server 10 as an update completion notification. Upon receiving the update completion notification, the server 10 can grasp the update conditions of the plurality of elevators 30(1) to 30(3).

As described above, according to the first embodiment, only the representative elevator needs to receive the update data from the server. Also, the differential information is used as the update data, thereby making it possible to reduce the update data size. Further, the update data can be sequentially transferred between the respective elevators through a dedicated network. With the above configuration, it is possible to reduce the communication time and costs which are required for the control program update of the plurality of elevators.

Further, the control program is sequentially updated one by one. Accordingly, the number of elevators that stop the service is only one at the same time, and other elevators are in a service available state, and inconvenience to a user can be suppressed to a minimum degree.

Further, since the representative elevator transmits the update completion notification to the server after the control program update of all the elevators has been completed, it is possible for the server to grasp the update condition of the control program for the respective elevators.

Second Embodiment

In a second embodiment, a description is given of a case in which a failure to update the control program by the update unit 36 is taken into consideration. A cause of failing to update the program may be, for example, the impropriety of received update data or the trouble of the nonvolatile memory 33. The above failure of the program update is taken into consideration, thereby enabling the server 10 to grasp the update conditions including the success or failure of the update of the control program.

The transfer unit 37(2) of the second elevator 30(2) associates update success/failure information representative of the success or failure of the update of the control program by the update unit 36(2) with the update data. The transfer unit 37(2) then transfers the update success/failure information to the subsequent elevator 30(3). The update success/failure information may be, for example, the combination of the ID number of the subject elevator with a flag indicative of the success or failure of the processing.

Likewise, the transfer unit 37(2) of the third elevator 30(3) sequentially associates the update success/failure information representative of the success or failure of the update of the control program by the update unit 36(3) with the update data. The transfer unit 37(3) then transfers the update success/failure information to the subsequent representative elevator 30(1). More specifically, the elevator 30(3) extracts the update success/failure information on the second elevator that has been already subjected to the updating process, which is included in the transferred update data, adds the update success/failure information on the subject elevator to the extracted information, and finally transfers the added information to the representative elevator 30(1).

Finally, the update information notification unit 38(1) of the representative elevator 30(1) can notify the server 10 of the update success/failure information on the elevators 30(2) and 30(3), which has been transferred from the final elevator 30(3) in addition to its own update success/failure information as an update completion notification.

As described above, according to the second embodiment, the respective elevators sequentially transmit the update success/failure information, and finally the representative elevator can notify the server of the update success/failure information on the respective elevators. As a result, the server can grasp the update result of the control program related to all of the elevators.

Third Embodiment

In the second embodiment, a description is given of a case in which even when the update fails in some elevator, the update data is sequentially continuously transmitted together with the update success/failure information until the update data has been completely transmitted to the final elevator. On the contrary, in a third embodiment, a description is given of a case in which when the update fails in some elevator, the update data is not transmitted to the subsequent elevator.

In the third embodiment, when the process of updating its own control program by the update unit 36(2) is successful, the transfer unit 37(2) of the second elevator 30(2) associates the update success information (for example, ID number of the subject elevator) indicating that the control program update of the subject elevator 30(2) is successful with the update data, and then transfers the information to the subsequent elevator 30(3).

Likewise, when the process of updating its own control program by the update unit 36(3) is successful, the transfer unit 37(3) of the third elevator 30(3) associates the update success information (for example, ID number of the subject elevator) indicating that the control program update of the subject elevator 30(3) is successful with the update data including the update success information of the previous second elevator, and then transfers the information to the subsequent representative elevator 30(1).

On the other hand, the second elevator 30(2) further includes an update information notification unit 38(2) that transmits its own update failure information and previous update success information on the elevator which is included in the update data directly to the server 10 when the process of updating its own control program by the update unit 36(2) fails. Further, the transfer unit 37(2) does not transmit the update data to the subsequent elevators when the process of updating its own control program by the update unit 36(2) fails.

Likewise, the third elevator 30(3) further includes an update information notification unit 38(3) that transmits its own update failure information and previous update success information on the elevator which is included in the update data directly to the server 10 when the process of updating its own control program by the update unit 36(3) fails. Further, the transfer unit 37(3) does not transmit the update success information to the representative elevator when the process of updating its own control program by the update unit 36(3) fails.

As described above, according to the third embodiment, the server can receive the notification directly from the elevator that has failed to be updated at a time when the update fails. As a result, the server can acquire the information on the elevator that has successfully updated and the information on the elevator that has failed to be updated from the respective elevators. Also, in the case where the update fails in some elevator, the possibility that the update fails becomes higher when the same update data is used in the subsequent elevator. For that reason, the update data is not transferred to the downstream elevator, thereby making it possible to limit the number of elevators that fail to be updated to one.

Fourth Embodiment

In the third embodiment, a description is given of a case in which when the update fails in some elevator, the update data is not transmitted to the subsequent elevators, and the elevator that has failed to be updated notifies the server 10 of the previous update success/failure information of the elevator on the block. On the contrary, in a fourth embodiment, a description is given of a case in which the respective elevators individually transmit their update success/failure information to the server 10.

In the fourth embodiment, the update information notification units 38 of the respective elevators directly notify the server 10 of the information related to the success or failure of the data updating process by the update unit 36. When the update has succeeded, the transfer unit 37 transfers the update data to the subsequent elevator. On the other hand, when the update has failed, the transfer unit 37 may or may not transfer the update data to the subsequent elevator. Then, the notification of the update success/failure information to the server 10 by the update information notification unit 38 can be conducted before or after the update data is transferred to the subsequent elevator.

As described above, according to the fourth embodiment, the server can directly acquire the information on the elevator that has successfully updated and the elevator that has failed to be updated from the respective elevators. In particular, since the respective elevators individually notify the server of the success or failure of the update, even in the case where one of the plurality of elevators which is currently being updated fails, and the transfer of the update data to the subsequent elevator is disenabled, the server can grasp the information on the elevators that have completely updated or failed to be updated up to then.

Fifth Embodiment

In the first to fourth embodiments, a description is given of a case in which the versions of the control programs which are stored in the nonvolatile memories 33 of the plurality of elevators 30 are identical with each other. On the contrary, in a fifth embodiment, a description is given of a mode that enables the data update with a reduction in communication time and costs in a case where the versions of the control programs which are stored in the nonvolatile memories 33 of the plurality of elevators 30 are different from each other.

The control program of the same version is not always stored into the respective nonvolatile memories 33 in all of the elevators such that the previous updating has failed during the updating operation. Under the circumstances, first of all, the update data acquisition unit 35(1) of the representative elevator 30(1) acquires the update data from the server 10, and temporarily stores the update data into the memory 32(1). The update data includes the differential information between the control program of the version which is retained by the representative elevator 30(1) and the control program of the latest version. The representative elevator 30(1) can update the control program on the nonvolatile memory 33(1) by using the differential information.

The transfer unit 37(1) of the representative elevator 30(1) acquires the version information of the control program which is retained by the subsequent elevator 30(2) before transferring the update data to the subsequent elevator 30(2). When the version of the version information is identical with the version of the control program which has been retained by the representative elevator 30(1) immediately before updating, the control program of the subsequent elevator can be updated by using the update data based on the differential information that is retained in the memory 32(2) of the representative elevator 30(1). Under the circumstances, the transfer unit 37(1) transfers the update data based on the differential information that is held in the memory 32(1) to the subsequent elevator 30(2).

On the other hand, when the version of the control program of the subsequent elevator 30(2) is different from the version of the control program that has been retained by the representative elevator 30(1) immediately before updating, the subsequent elevator 30(2) cannot accurately update the control program using the update data based on the differential information which is retained in the memory 32(1) of the representative elevator 30(1). Under the circumstances, the transfer unit 37(1) of the representative elevator 30(1) discards the update data in the memory 32(1), generates the following new update data, and transfers the update data to the subsequent elevator 30(2).

That is, the new update data is not the differential information that has been acquired from the server 10, but includes what corresponds to the updated control program per se which is stored in the nonvolatile memory 33(1). In the update unit 36(2) of the subsequent elevator 30(2), the control program in the nonvolatile memory 33(2) is overwritten by the control program of the latest version that is included in the new update data, thereby making it possible to update the control program in the nonvolatile memory 33(2) to the control program of the latest version.

Because the new update data includes the entire control program, the new update data is larger in size than the update data constituted by the differential information. However, because the communication speed of the network 40 which is used between the representative elevator 30(1) and the subsequent elevator 30(2) is generally higher than that communication speed of the communication line 20, an increase in the update data size hardly suffers from any problem.

In the second elevator 30(2), the processing is different according to the contents of the update data which have been received by the update data acquisition unit 35(2). When the received update data includes the entire control program, the update unit 36(2) overwrites the control program in the nonvolatile memory 33(2). Then, the transfer unit 37(2) transfers the update data to the subsequent elevator 30(3) as it is.

As described above, when the update data includes the entire control program, the control program can be uniformly updated by any elevators, thereby making it possible to use the same update data even in the subsequent elevators.

On the other hand, when the update data that has been received by the update data acquisition unit 35(2) includes the differential information, the update unit 36(2) updates the control program in the nonvolatile memory 33(2) based on the differential information.

A method of determining the contents of the update data which is transferred to the subsequent elevator by the transfer unit 37(2) is completely identical with the method that is used in the transfer unit 37(1) of the representative elevator 30(1). Information for determining whether the update data includes the differential information or the control program is included in the update data. The information is set by the server 10 and the elevator 30 that has generated the update data including the control program. The third elevator 30(3) conducts the same updating process as that of the second elevator 30(2).

As described above, according to the fifth embodiment, even if the version of the control program which is stored in the respective elevators is different from each other, the differential information can be used for the update data which is received from the server by the representative elevator, and such effects that the communication time and the costs are reduced can be obtained. Also, the communication line that is generally higher in speed than the network is used between the respective elevators, and the problem on the communication time hardly arises even if the entire control program is transmitted. Further, update using the control program of the latest version can be conducted on the elevators that are different in the version of the control program from each other.

Sixth Embodiment

In a sixth embodiment, a description is given of a case in which the update unit 36(1) of the representative elevator 30(1) implements the test operation after the control program has been successfully updated. The update unit 36(1) of the representative elevator 30(1) according to the sixth embodiment implements the test operation after the control program has been updated using the update data. Also, the transfer unit 37(1) of the representative elevator 30(1) transfers the update data to the subsequent elevator when the result of the test operation is a pass.

On the other hand, when the test operation is a fail, the transfer unit 37(1) does not execute the transfer of the update data to the subsequent elevator 30(2). Also, the update unit 36(1) notifies the server 10 of the update failure, and terminates the processing.

The update units 36(2) and 36(3) of the elevators 30(2) and 30(3) other than the representative elevator 30(1) do not conduct the test operation after the control program has been updated using the update data. This is because the control programs of the elevators 30(2) and 30(3) other than the representative elevator 30(1) are also rewritten to have the same version as that of the representative elevator 30(1), and therefore when the operation of the representative elevator 30(1) can be ensured, it can be assumed that the operation of the elevators 30(2) and 30(3) can be similarly ensured.

As has been described above, according to the sixth embodiment, the test operation of the representative elevator is conducted, thereby making it possible to conduct quality identification of the control program of the latest version before updating the control program of all the elevators. The test operation is conducted by only the representative elevator, and the elevators other than the representative elevator do not conduct the test operation. For that reason, it is possible to suppress a period of time during which the service stops due to the update of the control program to a shorter period of time. When the test operation of the representative elevator fails, the control programs of the other elevators can be prevented from being updated by the same update data in advance.

The invention claimed is:

1. A remote update system for an elevator control program, comprising:
   a plurality of elevators that are located within the same management group and connected to each other via a network, and provide services according to a control program held by each of the plurality of elevators; and
   a server that is connected to each of the plurality of elevators through a communication line, and delivers update data of the control program,
   wherein the server delivers to one predetermined representative elevator among the plurality of elevators the update data including differential information between the control program of a version before update of the representative elevator and the control program of the latest version to be updated to through the communication line,
   wherein the representative elevator updates its own control program based on the update data that is received from the server, and transmits the update data to an elevator to which the update data is to be subsequently transferred according to a predetermined transfer order through the network, and
   wherein each of the plurality of elevators other than the representative elevator sequentially transmits and receives the update data through the network according to the predetermined transfer order, and updates its own control program based on the received update data.

2. The remote update system for an elevator control program according to claim 1,
   wherein each of the plurality of elevators comprises:
   a storage unit that stores its own control program therein;
   an update data acquisition unit that receives the update data according to the predetermined transfer order;
   an update unit that updates the its own control program that is stored in the storage unit based on the differential information that is included in the update data; and
   a transfer unit that transfers the update data to the elevator to which the update data is to be subsequently transferred according to the predetermined transfer order.

3. The remote update system for an elevator control program according to claim 2,
   wherein the transfer unit transmits a sequential transfer completion notification for notifying the representative elevator that the transfer of the update data has been completed when there is no elevator to which the update data is to be subsequently transferred according to the predetermined transfer order.

4. The remote update system for an elevator control program according to claim 3,
wherein the representative elevator further comprises an update information notification unit that transmits an update completion notification for notifying the server that the data update of all of the plurality of elevators has been completed when receiving the sequential transfer completion notification.

5. The remote update system for an elevator control program according to claim 4,
wherein the transfer unit of each of the plurality of elevators other than the representative elevator transfers the update data to which program update success/failure information indicating whether or not the update of its own control program by the update unit is successful is sequentially added to the subsequent elevator, and
wherein the update information notification unit of the representative elevator receives the program update success/failure information together with the sequential transfer completion notification, and transmits the update completion notification including the program update success/failure information to the server.

6. The remote update system for an elevator control program according to claim 4,
wherein each of the plurality of elevators other than the representative elevator further comprises an update information notification unit that transmits its own update failure information and update success information of the previous elevator which is included in the update data to the server when the update of its own control program by the update unit fails,
wherein the transfer unit of each of the plurality of elevators other than the representative elevator transfers the update data to which the update success information is sequentially added to the subsequent elevator when the update of its own control program by the update unit fails succeeds, and
wherein the update information notification unit of the representative elevator transmits the update completion notification including the update success information to the server when receiving the update success information together with the sequential transfer completion notification.

7. The remote update system for an elevator control program according to claim 6,
wherein the update information notification unit of each of the plurality of elevators other than the representative elevator transmits the update success notification of the elevator to the server when the update of its own control program by the update unit succeeds, and transmits update failure notification of the elevator to the server when the update of the control program fails.

8. The remote update system for an elevator control program according to claim 7,
wherein the transfer unit of each of the plurality of elevators other than the representative elevator does not execute the transfer of the update data to the elevator to which the update data is to be subsequently transferred according to the predetermined transfer order when the update of its own control program by the update unit fails.

9. The remote update system for an elevator control program according to claim 2,
wherein the update unit of the representative elevator implements test operation after its own control program is updated based on the update data,
wherein the transfer unit of the representative elevator transfers the update data to the elevator to which the update data is to be subsequently transferred according to the predetermined transfer order when a result of the test operation is a pass, and does not execute the transfer of the update data when the result of the test operation is a fail, and
wherein the update information notification unit of the representative elevator transmits an update fail notification to the server when the result of the test operation is the fail.

10. The remote update system for an elevator control program according to claim 2,
wherein the transfer unit of the representative elevator inquires about version information on the control program before update which is stored in the storage unit of the elevator to which the update data is to be subsequently transferred according to the predetermined transfer order, transfers the update data including the differential information that is acquired from the server as it is to the elevator to which the update data is to be subsequently transferred when the version information is the same as the version information of its own control program before update, and generates new update data including the control program after update by the update unit to transfer the new update data to the elevator to which the update data is to be subsequently transferred when the version information is not the same,
wherein the update unit of the plurality of elevators other than the representative elevator updates its own control program that is stored in the storage unit based on the differential information when the update data that is received from the previous elevator includes the differential information, and updates its own control program that is stored in the storage unit by the control program after update when the update data that is received from the previous elevator does not include the differential information and includes the control program after update, and
wherein the transfer unit of the plurality of elevators other than the representative elevator inquires about the version information on the control program before update which is stored in the storage unit of the elevator to which the update data is to be subsequently transferred according to the predetermined transfer order when the update data that is received from the previous elevator includes the differential information, transfers the update data including the differential information that is acquired from the previous elevator as it is to the elevator to which the update data is to be subsequently transferred when the version information is the same as the version information of its own control program before update, generates new update data including the control program after update by the update unit to transfer the new update data to the elevator to which the update data is to be subsequently transferred when the version information is not the same, and transfers the control program after update as it is to the elevator to which the update data is to be subsequently transferred when the update data that is received from the previous elevator does not include the differential information and includes the control program after update.

11. The remote update system for an elevator control program according to claim 1, wherein at least one of the representative elevator and the plurality of elevators other than the representative elevator stops servicing during the updating of its own control program based on the update data.

12. The remote update system for an elevator control program according to claim 1, wherein each of the plurality of elevators other than the representative elevator does not receive the update data from the server.

* * * * *